United States Patent
Zhang (10) Patent No.: US 10,334,424 B2
(45) Date of Patent: Jun. 25, 2019

(54) DISCOVERY RESOURCE TIME-FREQUENCY HOPPING METHOD AND TERMINAL

(71) Applicant: Huawei Technologies Co., Ltd., Shenzhen (CN)

(72) Inventor: Qizhi Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 221 days.

(21) Appl. No.: 15/243,238

(22) Filed: Aug. 22, 2016

(65) Prior Publication Data

US 2016/0360396 A1 Dec. 8, 2016

Related U.S. Application Data

(63) Continuation of application No. PCT/CN2014/072415, filed on Feb. 22, 2014.

(51) Int. Cl.
*H04W 8/00* (2009.01)
*H04W 48/16* (2009.01)
(Continued)

(52) U.S. Cl.
CPC ............ *H04W 8/005* (2013.01); *H04B 1/692* (2013.01); *H04W 48/16* (2013.01);
(Continued)

(58) Field of Classification Search
None
See application file for complete search history.

(56) References Cited

U.S. PATENT DOCUMENTS

| 7,706,311 B2 | 4/2010 | Bi et al. |
| 2010/0110929 A1* | 5/2010 | Li .................. H04B 1/7143 370/254 |

(Continued)

FOREIGN PATENT DOCUMENTS

| CN | 102843162 A | 12/2012 |
| CN | 103260244 A | 8/2013 |

(Continued)

OTHER PUBLICATIONS

"System-level performance of D2D discovery," 3GPP TSG RAN WG1 Meeting #74bis, Guangzhou, China, R1-134074, pp. 1-9, $3^{rd}$ Generation Partnership Project, Valbonne, France (Oct. 7-11, 2013).

(Continued)

*Primary Examiner* — James P Duffy
(74) *Attorney, Agent, or Firm* — Leydig, Voit & Mayer, Ltd.

(57) ABSTRACT

Embodiments of the present invention disclose a discovery resource time-frequency hopping method and a terminal, where the terminal includes: a resource determining unit, configured to determine a real discovery resource in a real discovery resource pool; a frequency-domain expansion unit, configured to: perform frequency-domain virtual expansion on the real discovery resource pool according to a frequency division multiplexing factor value, and determine a virtual discovery resource in a virtual discovery resource pool corresponding to the real discovery resource pool; a time-frequency hopping unit, configured to perform, according to a time-frequency hopping solution, virtual time-frequency hopping on a correspondence between the terminal and the determined virtual discovery resource in the virtual discovery resource pool; and a signal sending unit, configured to send a discovery signal by using a real discovery resource that corresponds to a virtual discovery (Continued)

resource which is occupied after the virtual time-frequency hopping.

8 Claims, 4 Drawing Sheets

(51) Int. Cl.
*H04B 1/692* (2011.01)
*H04W 72/04* (2009.01)
*H04W 76/14* (2018.01)

(52) U.S. Cl.
CPC ... *H04W 72/0446* (2013.01); *H04W 72/0453* (2013.01); *H04W 76/14* (2018.02)

(56) References Cited

U.S. PATENT DOCUMENTS

| | | |
|---|---|---|
| 2013/0010661 A1 | 1/2013 | Esteves et al. |
| 2013/0148557 A1 | 6/2013 | Sampath et al. |
| 2015/0078466 A1 | 3/2015 | Zhou et al. |

FOREIGN PATENT DOCUMENTS

| | | |
|---|---|---|
| CN | 103338497 A | 10/2013 |
| CN | 103428817 A | 12/2013 |
| CN | 103442442 A | 12/2013 |
| CN | 103597862 A | 2/2014 |

OTHER PUBLICATIONS

"Further discussion on resource allocation for D2D discovery," 3GPP TSG RAN WG1 Meeting #76, Prague, Czech Republic, R1-140098, 3$^{rd}$ Generation Partnership Project, Valbonne, France (Feb. 10-14, 2014).

"Resource Allocation for Discovery Signal," 3GPP TSG-RAN WG1 Meeting #76, Prague, Czech Republic, R1-140200, pp. 1-3, 3$^{rd}$ Generation Partnership Project, Valbonne, France (Feb. 10-14, 2014).

"Procedures for Type 1 and Type 2 Discovery Resource Allocation," 3GPP TSG RAN WG2 Meeting #85, Prague, Czech Republic, R2-140422, 3$^{rd}$ Generation Partnership Project, Valbonne, France (Feb. 10-14, 2014).

"Comparison for Type 1, Type 2a, and Type 2b Discovery Resource Allocation," 3GPP TSG RAN WG2 Meeting #83bis, Ljubljana, Slovenia, R2-133278, 3$^{rd}$ Generation Partnership Project, Valbonne, France (Oct. 7-11, 2013).

* cited by examiner

DISCOVERY RESOURCE TIME-FREQUENCY HOPPING METHOD AND TERMINAL

CROSS-REFERENCE TO RELATED APPLICATIONS

This application is a continuation of International Application No. PCT/CN2014/072415, filed on Feb. 22, 2014, which is hereby incorporated by reference in its entirety.

TECHNICAL FIELD

Embodiments of the present invention relate to the field of computer application technologies, and in particular, to a discovery resource time-frequency hopping method and a terminal.

BACKGROUND

D2D (device-to-device) communication refers to allowing devices to directly communicate by multiplexing a real discovery resource pool under the control of a base station. The base station performs frequency division multiplexing and time division multiplexing on the real discovery resource pool to obtain m×n real discovery resources and further control a UE (user equipment) to send a discovery signal by using a corresponding real discovery resource. Time-frequency hopping is performed on a correspondence between the UE and the real discovery resources in the real discovery resource pool according to a particular rule. A time-frequency hopping solution of the real discovery resource pool may include a deterministic time-frequency hopping solution and a non-deterministic time-frequency hopping solution.

For the deterministic time-frequency hopping solution, for example, $i(t)=i(0)$, $j(t)=(j(0)+i(0)*t) \% n$, that is, a time-frequency location, in a two-dimensional array m×n, of a discovery signal sent by the UE in a $t^{th}$ frame is only exclusively determined by a time-frequency location, in the two-dimensional array m×n, of a discovery signal sent by the UE in a $0^{th}$ frame and a frame identification code t of the current frame. If discovery signals sent by a transmit end and a receive end are in a same real discovery resource, and after time-frequency hopping is performed based on the deterministic time-frequency hopping solution, the discovery signals sent by the transmit end and the receive end are still in the same real discovery resource, the transmit end sends the discovery signal by using a target real discovery resource and receives, by using the target real discovery resource, the discovery signal sent by the receive end. In this case, strength of the discovery signal sent by the transmit end is much higher than that of the received discovery signal, and therefore, the transmit end can only send the discovery signal but cannot receive the discovery signal sent by the receive end. Similarly, the receive end that sends the discovery signal by using the target discovery resource can also only send the discovery signal but cannot receive the discovery signal sent by the transmit end.

For the non-deterministic time-frequency hopping solution, for example, a random time-frequency hopping solution, a receive end cannot determine time-frequency locations, in a matrix m×n, of discovery signals sent by a transmit end in different frames, and therefore cannot combine the discovery signals sent by the transmit end in different frames to acquire a signal having a greatest signal-to-noise ratio, where the signal having the greatest signal-to-noise ratio is the discovery signal sent by the transmit end.

SUMMARY

To resolve technical problems, embodiments of the present invention provide a discovery resource time-frequency hopping method and a terminal, which can maintain an advantage of combination and lower a probability of sending, by multiple terminals, discovery signals by unlimitedly using a same real discovery resource.

A first aspect of the present invention provides a terminal, including:

a resource determining unit, configured to determine a real discovery resource in a real discovery resource pool;

a frequency-domain expansion unit, configured to: perform frequency-domain virtual expansion on the real discovery resource pool according to a preset frequency division multiplexing factor value or a frequency division multiplexing factor value broadcast by a base station, and determine a virtual discovery resource in a virtual discovery resource pool corresponding to the real discovery resource pool;

a time-frequency hopping unit, configured to perform, according to a preset time-frequency hopping solution based on the virtual discovery resource pool or a time-frequency hopping solution that is based on the virtual discovery resource pool and that is broadcast by the base station, virtual time-frequency hopping on a correspondence between the terminal and the virtual discovery resource which is determined by the frequency-domain expansion unit and which is in the virtual discovery resource pool; and a signal sending unit, configured to send a discovery signal by using a real discovery resource that corresponds to a virtual discovery resource which is occupied after the time-frequency hopping unit performs the virtual time-frequency hopping.

In a first possible implementation manner, wherein the frequency division multiplexing factor value is X and the real discovery resource pool includes N sub-bands, the virtual discovery resource pool obtained after the frequency-domain virtual expansion is performed on the real discovery resource pool includes N×X virtual sub-bands, where virtual expansion is performed on each sub-band to obtain X virtual sub-bands, and the virtual discovery resource is determined in sub-channels corresponding to the X virtual sub-bands obtained after the expansion.

With reference to the first possible implementation manner of the first aspect, in a second possible implementation manner, wherein the virtual discovery resource pool obtained after virtual expansion is performed on an $m^{th}$ sub-band in the real discovery resource pool includes an $m^{th}$ virtual sub-band, an $(N+m)^{th}$ virtual sub-band, an $(N\times2+m)^{th}$ virtual sub-band ..., and an $(N\times(X-1)+m)^{th}$ virtual sub-band, and therefore, the N×X virtual sub-bands obtained after the virtual expansion include X expansion duplicates, where every N continuous virtual sub-bands in the virtual discovery resource pool form one expansion duplicate.

With reference to the second possible implementation manner of the first aspect, in a third possible implementation manner, the relationship hopping unit is further configured to: perform, by using a same time-frequency hopping solution, virtual time-frequency hopping on the correspondence between the terminal and the virtual discovery resource which is determined by the frequency-domain expansion unit and which is in a same expansion duplicate of the virtual discovery resource pool.

A second aspect of the present invention provides a terminal, including a network interface, a memory, and a processor, where the memory stores a group of program code, and the processor is configured to call the program code stored in the memory, to execute the following operations:

determining a real discovery resource in a real discovery resource pool;

performing frequency-domain virtual expansion on the real discovery resource pool according to a preset frequency division multiplexing factor value or a frequency division multiplexing factor value broadcast by a base station and determining a virtual discovery resource in a virtual discovery resource pool corresponding to the real discovery resource pool;

performing, according to a preset time-frequency hopping solution based on the virtual discovery resource pool or a time-frequency hopping solution that is based on the virtual discovery resource pool and that is broadcast by the base station, virtual time-frequency hopping on a correspondence of the determined virtual discovery resource in the virtual discovery resource pool; and sending a discovery signal by using a real discovery resource that corresponds to a virtual discovery resource which is occupied after the virtual time-frequency hopping.

A third aspect of the present invention provides a terminal, including:

a resource determining unit, configured to determine a real discovery resource in a real discovery resource pool;

a time-frequency hopping unit, configured to perform, according to a corresponding preset time-frequency hopping solution or a corresponding time-frequency hopping solution broadcast by a base station, time-frequency hopping on a correspondence between the terminal and the real discovery resource which is determined by the resource determining unit and which is in the real discovery resource pool; and a signal sending unit, configured to send a discovery signal by using a real discovery resource that is in the real discovery resource pool and that is occupied after the time-frequency hopping unit performs the time-frequency hopping.

In a first possible implementation manner, the time-frequency hopping solution in the real discovery resource pool includes at least two time-frequency hopping solutions.

A fourth aspect of the present invention provides a terminal, including a network interface, a memory, and a processor, where the memory stores a group of program code, and the processor is configured to call the program code stored in the memory, to execute the following operations:

determining a real discovery resource in a real discovery resource pool;

performing, according to a corresponding preset time-frequency hopping solution or a corresponding time-frequency hopping solution broadcast by a base station, time-frequency hopping on a correspondence between the terminal and the determined real discovery resource in the real discovery resource pool; and sending a discovery signal by using a real discovery resource that is in the real discovery resource pool and that is occupied after the time-frequency hopping.

A fifth aspect of the present invention provides a discovery resource time-frequency hopping method configured for a terminal, wherein the method including:

determining a real discovery resource in a real discovery resource pool;

performing frequency-domain virtual expansion on the real discovery resource pool according to a preset frequency division multiplexing factor value or a frequency division multiplexing factor value broadcast by a base station and determining a virtual discovery resource in a virtual discovery resource pool corresponding to the real discovery resource pool;

performing, according to a preset time-frequency hopping solution based on the virtual discovery resource pool or a time-frequency hopping solution that is based on the virtual discovery resource pool and that is broadcast by the base station, virtual time-frequency hopping on a correspondence between the terminal and the determined virtual discovery resource in the virtual discovery resource pool; and sending a discovery signal by using a real discovery resource that corresponds to a virtual discovery resource which is occupied after the virtual time-frequency hopping.

In a first possible implementation manner, the performing frequency-domain virtual expansion on the real discovery resource pool according to a preset frequency division multiplexing factor value or a frequency division multiplexing factor value broadcast by a base station and determining a virtual discovery resource in a virtual discovery resource pool corresponding to the real discovery resource pool includes:

the frequency division multiplexing factor value is X and the real discovery resource pool includes N sub-bands, the virtual discovery resource pool obtained after the virtual expansion is performed on the real discovery resource pool includes N×X virtual sub-bands, where virtual expansion is performed on each sub-band to obtain X virtual sub-bands, and the virtual discovery resource is determined in sub-channels corresponding to the X virtual sub-bands obtained after the expansion.

With reference to the first possible implementation manner of the fifth aspect, in a second possible implementation manner, that a virtual discovery resource pool obtained after the virtual expansion is performed on the real discovery resource pool includes N×X virtual sub-bands, where virtual expansion is performed on each sub-band to obtain X virtual sub-bands includes:

the virtual discovery resource pool obtained after virtual expansion is performed on an $m^{th}$ sub-band in the real discovery resource pool includes an $m^{th}$ virtual sub-band, an $(N+m)^{th}$ virtual sub-band, an $(N\times2+m)^{th}$ virtual sub-band . . . , and an $(N\times(X-1)+m)^{th}$ virtual sub-band, and therefore, the N×X virtual sub-bands obtained after the virtual expansion include X expansion duplicates, where every N continuous virtual sub-bands in the virtual discovery resource pool form one expansion duplicate.

With reference to the second possible implementation manner of the fifth aspect, in a third possible implementation manner, the performing, according to a preset time-frequency hopping solution based on the virtual discovery resource pool or a time-frequency hopping solution that is based on the virtual discovery resource pool and that is broadcast by the base station, virtual time-frequency hopping on a determined of the determined virtual discovery resource in the virtual discovery resource pool includes:

performing, by using a same time-frequency hopping solution, virtual time-frequency hopping on the correspondence between the terminal and the determined virtual discovery resource in a same expansion duplicate of the virtual discovery resource pool.

A sixth aspect of the present invention provides a computer storage medium, where the computer storage medium stores a program, and when executed, the program includes all or some of the steps of the discovery resource time-frequency hopping method provided by the fifth aspect of the embodiments of the present invention.

A seventh aspect of the present invention provides a discovery resource time-frequency hopping method configured for a terminal, wherein the method including:

determining a real discovery resource in a real discovery resource pool;

performing, according to a corresponding preset time-frequency hopping solution or a corresponding time-frequency hopping solution broadcast by a base station, time-frequency hopping on a correspondence between the terminal and the determined real discovery resource in the real discovery resource pool; and sending a discovery signal by using a real discovery resource that is in the real discovery resource pool and that is occupied after the time-frequency hopping.

In a first possible implementation manner, the time-frequency hopping solution in the real discovery resource pool includes at least two time-frequency hopping solutions.

An eighth aspect of the present invention provides a computer storage medium, where the computer storage medium stores a program, and when executed, the program includes all or some of the steps of the discovery resource time-frequency hopping method provided by the seventh aspect of the embodiments of the present invention.

In the embodiments of the present invention, a terminal determines a real discovery resource in a real discovery resource pool, performs frequency-domain virtual expansion on the real discovery resource pool according to a preset frequency division multiplexing factor value or a frequency division multiplexing factor value broadcast by a base station and determines a virtual discovery resource in a virtual discovery resource pool corresponding to the real discovery resource pool, then performs, according to a preset time-frequency hopping solution based on the virtual discovery resource pool or a time-frequency hopping solution that is based on the virtual discovery resource pool and that is broadcast by the base station, virtual time-frequency hopping on a correspondence between the terminal and the determined virtual discovery resource in the virtual discovery resource pool, and sends a discovery signal by using a real discovery resource that corresponds to a virtual discovery resource which is occupied after the virtual time-frequency hopping. In this way, an advantage of combination can be maintained, and a probability of sending, by multiple terminals, discovery signals by unlimitedly using a same real discovery resource can be lowered.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The present invention provides a discovery resource time-frequency hopping method and a terminal, which can maintain an advantage of combination and lower a probability of sending, by multiple terminals, discovery signals by unlimitedly using a same real discovery resource. Detailed descriptions separately provided in the following.

Figure 1:
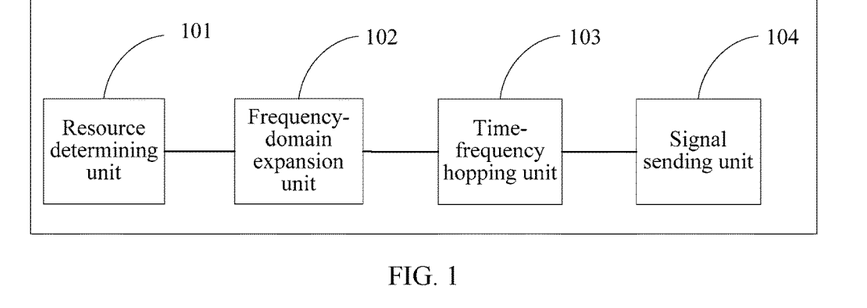
FIG. 1 is a schematic structural diagram of a terminal according to a first embodiment of the present invention.

Referring to FIG. 1, FIG. 1 is a schematic structural diagram of a terminal according to a first embodiment of the present invention. The terminal may include at least a resource determining unit 101, a frequency-domain expansion unit 102, a time-frequency hopping unit 103, and a signal sending unit 104.

The resource determining unit 101 is configured to determine a real discovery resource in a real discovery resource pool.

Figure 2:
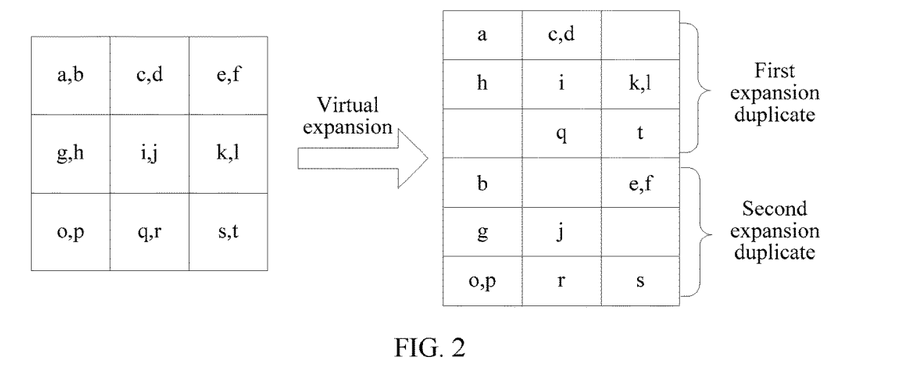
FIG. 2 is a schematic structural diagram of a virtual discovery resource pool corresponding to a real discovery resource pool on which frequency-domain virtual expansion has been performed according to an embodiment of the present invention.

By using a schematic structural diagram, shown in FIG. 2, of a real discovery resource pool as an example, frequency division multiplexing and time division multiplexing are performed on the real discovery resource pool to obtain 3×3 real discovery resources. The real discovery resource pool includes three sub-bands and three sub-channels. In the real discovery resource pool shown in FIG. 2, each row represents a sub-band, and each column represents a sub-channel; a two-dimensional array A[3][3] may be used to represent the real discovery resource pool. The terminal may determine the real discovery resource in the real discovery resource pool. For example, a real discovery resource determined by a terminal a in the real discovery resource pool is a real discovery resource located at A[0][0]. When a quantity of terminals sending discovery signals is greater than a quantity of real discovery resources, at least two terminals use a same real discovery resource to send discovery signals.

The frequency-domain expansion unit 102 is configured to: perform frequency-domain virtual expansion on the real discovery resource pool according to a preset frequency division multiplexing factor value or a frequency division multiplexing factor value broadcast by a base station, and determine a virtual discovery resource in a virtual discovery resource pool corresponding to the real discovery resource pool.

The frequency-domain expansion unit 102 may perform frequency-domain virtual expansion on the real discovery resource pool according to the preset frequency division multiplexing factor value or the frequency division multiplexing factor value broadcast by the base station, and does not perform any change in a time domain. By using the schematic structural diagram, shown in FIG. 2, of a virtual discovery resource pool corresponding to a real discovery resource pool on which frequency-domain virtual expansion has been performed as an example, the frequency division multiplexing factor value is 2, and in this case, the frequency-domain expansion unit 102 may perform frequency-domain virtual expansion on the real discovery resource pool according to the frequency division multiplexing factor value. A virtual discovery resource pool after the frequency-domain virtual expansion is doubled in a frequency domain and does not change in the time domain. Further, the frequency-domain expansion unit 102 determines the virtual discovery resource in the virtual discovery resource pool. For example, a virtual discovery resource determined by the terminal a in the virtual discovery resource pool is a virtual discovery resource located at B[0][0], and a virtual discovery resource determined by a terminal b in the virtual discovery resource pool is a virtual discovery resource located at B[3][0], where the terminal b sends a discovery signal by using a same real discovery resource as the terminal a before the virtual expansion. In this way, a probability of unlimitedly using a same discovery resource by multiple terminals can be lowered.

In an optional implementation manner, assuming that the frequency division multiplexing factor value is X and the real discovery resource pool includes N sub-bands, a virtual discovery resource pool obtained after the frequency-domain expansion unit 102 performs frequency-domain virtual expansion on the real discovery resource pool includes N×X virtual sub-bands, where virtual expansion is performed on each sub-band to obtain X virtual sub-bands, and the terminal may determine the virtual discovery resource in sub-channels corresponding to the X virtual sub-bands obtained after the expansion.

Further optionally, a virtual discovery resource pool obtained after the frequency-domain expansion unit 102 performs virtual expansion on an $m^{th}$ sub-band in the real discovery resource pool includes an $m^{th}$ virtual sub-band, an $(N+m)^{th}$ virtual sub-band, an $(N \times 2+m)^{th}$ virtual sub-band . . . , and an $(N \times (X-1)+m)^{th}$ virtual sub-band, and therefore, the N×X virtual sub-bands obtained after the frequency-domain virtual expansion include X expansion duplicates. Every N continuous virtual sub-bands in the virtual discovery resource pool form one expansion duplicate. For example, in the schematic structural diagram, shown in FIG. 2, of a virtual discovery resource pool corresponding to a real discovery resource pool on which frequency-domain virtual expansion has been performed, a two-dimensional array A[3][3] may be used to represent the real discovery resource pool, and a two-dimensional array B[6][3] may be used to represent the virtual discovery resource pool obtained after the frequency-domain virtual expansion. A virtual discovery resource pool obtained after virtual expansion is performed on a first row of the real discovery resource pool may include a first row and a fourth row. The first row to a third row of the virtual discovery resource pool form a first expansion duplicate, and the fourth row to a sixth row of the virtual discovery resource pool form a second expansion duplicate.

The time-frequency hopping unit 103 is configured to perform, according to a preset time-frequency hopping solution based on the virtual discovery resource pool or a time-frequency hopping solution that is based on the virtual discovery resource pool and that is broadcast by the base station, virtual time-frequency hopping on a correspondence between the terminal and the virtual discovery resource which is determined by the frequency-domain expansion unit 102 and which is in the virtual discovery resource pool.

After the frequency-domain expansion unit 102 performs the frequency-domain virtual expansion on the real discovery resource pool and determines the virtual discovery resource in the virtual discovery resource pool corresponding to the real discovery resource pool, the time-frequency hopping unit 103 may perform virtual time-frequency hopping on the correspondence between the terminal and the determined virtual discovery resource in the virtual discovery resource pool according to the preset time-frequency hopping solution based on the virtual discovery resource pool or the time-frequency hopping solution that is based on the virtual discovery resource pool and that is broadcast by the base station, so as to obtain correspondences, on which the time-frequency hopping has been performed, between terminals and virtual discovery resources in the virtual discovery resource pool. For example, in FIG. 2, a virtual discovery resource, determined by the terminal a, in the virtual discovery resource pool after the virtual expansion is a virtual discovery resource located at B[0][0]. The time-frequency hopping unit 103 performs virtual time-frequency hopping on the correspondence with the virtual discovery resource in the virtual discovery resource pool according to the preset time-frequency hopping solution based on the virtual discovery resource pool or the time-frequency hopping solution that is based on the virtual discovery resource pool and that is broadcast by the base station. A virtual discovery resource determined by the terminal a after the virtual time-frequency hopping is the virtual discovery resource located at B[0][0].

Figure 3:
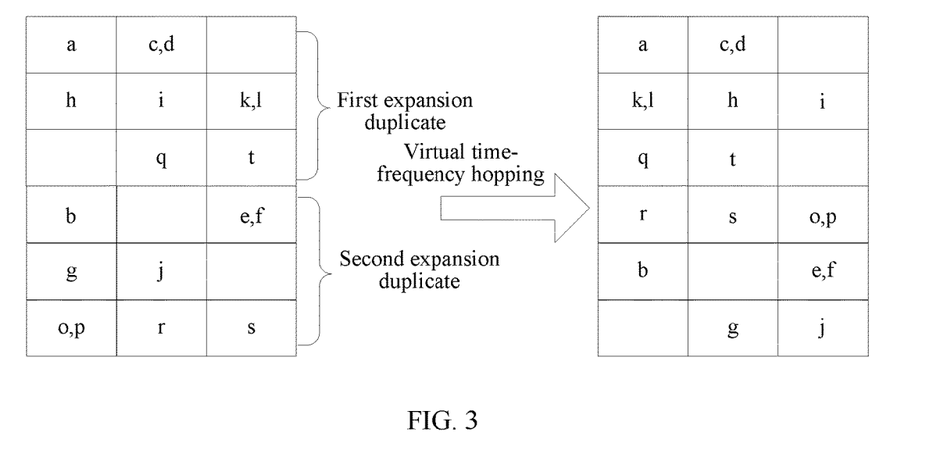
FIG. 3 is a schematic structural diagram of a virtual discovery resource pool after virtual time-frequency hopping is performed according to an embodiment of the present invention.

The time-frequency hopping unit 103 is further configured to perform, by using a same time-frequency hopping solution, virtual time-frequency hopping on the correspondence between the terminal and the virtual discovery resource which is determined by the frequency-domain expansion unit 102 and which is in a same expansion duplicate of the virtual discovery resource pool. For example, a time-frequency hopping solution for the first expansion duplicate may be $i(t)=i(0)$, $j(t)=(j(0)+i(0)*t) \% n$, where $n=3$ and $t=1$, and the time-frequency hopping unit 103 may determine the virtual discovery resource in the virtual discovery resource pool according to the time-frequency hopping solution. A time-frequency location of the terminal a in a $0^{th}$ frame may be B[0][0] as shown in FIG. 3, that is $i(0)=0$, $j(0)=0$, and in this case, $i(1)=i(0)=0$, $j(1)=(j(0)+i(0)) \%3=0$, that is, a time-frequency location, in a first frame, of the terminal a after the time-frequency hopping is B[0][0]. A time-frequency hopping solution for the second expansion duplicate may be $i(t)=(i(0)+t) \% n$, $j(t)=(j(0)+i(0)*t-1)\% n$, where $n=3$ and $t=1$, and the time-frequency hopping unit 103 may determine the virtual discovery resource in the virtual discovery resource pool according to the time-frequency hopping solution. A time-frequency location, in the $0^{th}$ frame, of the terminal b in the second expansion duplicate may be B[0][0] as shown in FIG. 3, that is, i(0)=0, j(0)=0, and in this case, i(1)=(i(0)+1)%3=1, j(1)=(j(0)+i(0)−1)%3=0, that is, a time-frequency location, in the first frame, of the terminal b in the second expansion duplicate after the time-frequency hopping is B[1][0]. Optionally, when a quantity of sub-bands of the real discovery resource is different from a quantity of sub-channels, virtual time-frequency hopping may be performed, by using a same time-frequency hopping solution, on correspondences between terminals and virtual discovery resources in the virtual discovery resource pool after the frequency-domain virtual expansion.

Figure 4:
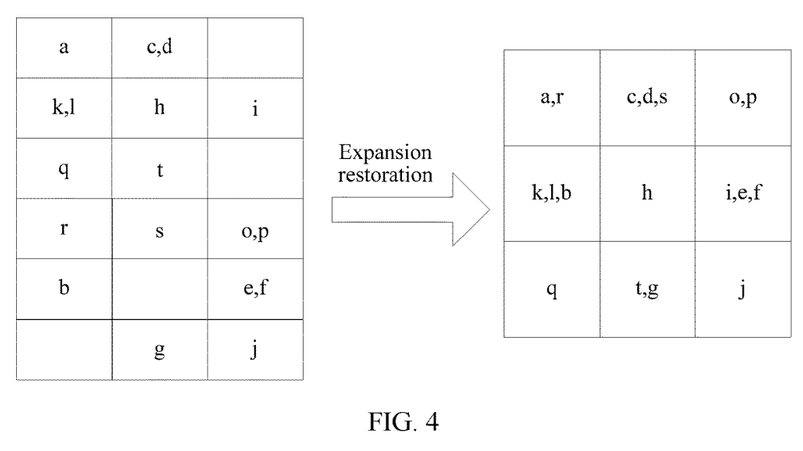
FIG. 4 is a schematic structural diagram of a real discovery resource pool that corresponds to a virtual discovery resource pool virtual time-frequency hopping is performed according to an embodiment of the present invention.

The signal sending unit 104 is configured to send a discovery signal by using a real discovery resource that corresponds to a virtual discovery resource which is occupied after the time-frequency hopping unit 103 performs the virtual time-frequency hopping. The time-frequency hopping unit 103 performs time-frequency hopping on the correspondence with the virtual discovery resource in the virtual discovery resource pool and obtains a correspondence, on which the time-frequency hopping has been performed, between terminals and virtual discovery resources in the virtual discovery resource pool, and the signal sending unit 104 may send the discovery signal by using the real discovery resource that corresponds to a virtual discovery resource which is occupied after the time-frequency hopping. Specifically, by using a schematic structural diagram, shown in FIG. 4, of a real discovery resource pool that corresponds to a virtual discovery resource pool after virtual time-frequency hopping is performed as an example, a virtual discovery resource, determined by the terminal a after time-frequency hopping that is based on the virtual discovery resource pool, in the virtual discovery resource pool is a virtual discovery resource located at B[0][0], and in this case, the signal sending unit 104 may send the discovery signal by using a real discovery resource that corresponds to the virtual discovery resource, where the real discovery resource that corresponds to the virtual discovery resource and that is occupied by the terminal a is a real discovery resource located at A[0][0].

In the terminal shown in FIG. 1, the resource determining unit 101 determines a real discovery resource in a real discovery resource pool; the frequency-domain expansion unit 102 performs frequency-domain virtual expansion on the real discovery resource pool according to a preset frequency division multiplexing factor value or a frequency division multiplexing factor value broadcast by a base station and determines a virtual discovery resource in a virtual discovery resource pool corresponding to the real discovery resource pool; the time-frequency hopping unit 103 performs, according to a preset time-frequency hopping solution based on the virtual discovery resource pool or a time-frequency hopping solution that is based on the virtual discovery resource pool and that is broadcast by the base station, virtual time-frequency hopping on a correspondence between the terminal and the determined virtual discovery resource in the virtual discovery resource pool; and the signal sending unit 104 sends a discovery signal by using a real discovery resource that corresponds to a virtual discovery resource which is occupied after the virtual time-frequency hopping. In this way, an advantage of combination can be maintained, and a probability of sending, by multiple terminals, discovery signals by unlimitedly using a same real discovery resource can be lowered.

Figure 5:
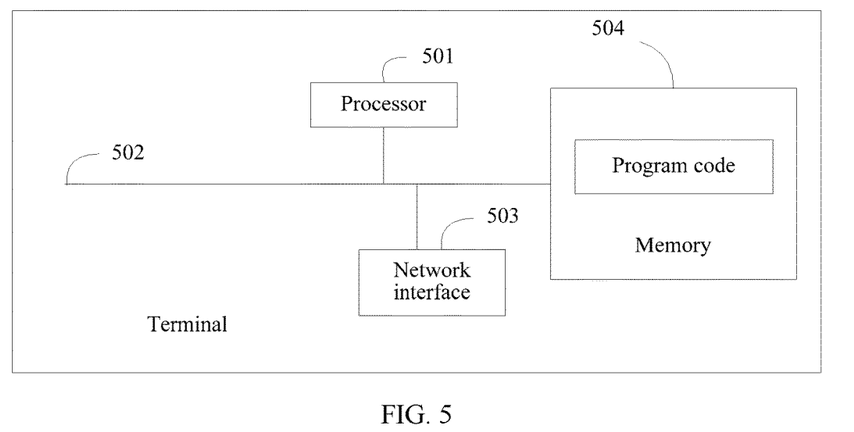
FIG. 5 is a schematic structural diagram of a terminal according to a second embodiment of the present invention.

Referring to FIG. 5, FIG. 5 is a schematic structural diagram of a terminal according to a second embodiment of the present invention, and the terminal is configured to execute a discovery resource time-frequency hopping method provided by an embodiment of the present invention. As shown in FIG. 5, the terminal includes: at least one processor 501, such as a CPU, at least one network interface 503, a memory 504, and at least one communications bus 502. The communications bus 502 is configured to implement connection and communication between these components. The memory 504 may include a high-speed RAM memory or may further include a non-volatile memory (non-volatile memory), for example, at least one magnetic disk memory. Alternatively, the memory 504 may include at least one storage apparatus located far away from the foregoing processor 501. The memory 504 store a group of program code, and the processor 501 calls the program code stored in the memory 504, to execute the following operations:

determining a real discovery resource in a real discovery resource pool;

performing frequency-domain virtual expansion on the real discovery resource pool according to a preset frequency division multiplexing factor value or a frequency division multiplexing factor value broadcast by a base station and determining a virtual discovery resource in a virtual discovery resource pool corresponding to the real discovery resource pool;

performing, according to a preset time-frequency hopping solution based on the virtual discovery resource pool or a time-frequency hopping solution that is based on the virtual discovery resource pool and that is broadcast by the base station, virtual time-frequency hopping on a correspondence between the terminal and the determined virtual discovery resource in the virtual discovery resource pool; and sending a discovery signal by using, by the network interface 503, a real discovery resource that corresponds to a virtual discovery resource which is occupied after the virtual time-frequency hopping.

In an optional embodiment, that the processor 501 calls the program code stored in the memory 504 to perform frequency-domain virtual expansion on the real discovery resource pool according to a preset frequency division multiplexing factor value or a frequency division multiplexing factor value broadcast by a base station and determine a virtual discovery resource in a virtual discovery resource pool corresponding to the real discovery resource pool is specifically:

assuming that frequency division multiplexing factor value is X and the real discovery resource pool includes N sub-bands, a virtual discovery resource pool obtained after the virtual expansion is performed on the real discovery resource pool includes N×X virtual sub-bands, where virtual expansion is performed on each sub-band to obtain X virtual sub-bands, and the terminal may determine the virtual discovery resource in sub-channels corresponding to the X virtual sub-bands obtained after the expansion.

By using a schematic structural diagram, shown in FIG. 2, of a virtual discovery resource pool corresponding to a real discovery resource pool on which frequency-domain virtual expansion has been performed as an example, the real discovery resource pool includes three sub-bands, the frequency division multiplexing factor value is 2, and in this case, a virtual discovery resource pool obtained after the processor 501 performs frequency-domain virtual expansion on the real discovery resource pool includes six virtual sub-bands, where virtual expansion is performed on each sub-band to obtain two virtual sub-bands. Further, the processor 401 may determine the virtual discovery resource in sub-channels corresponding to the two virtual sub-bands obtained after the frequency-domain virtual expansion. For example, a two-dimensional array A[3][3] may be used to represent the real discovery resource pool, and a two-dimensional array B[6][3] may be used to represent the virtual discovery resource pool obtained after the frequency-domain virtual expansion. A real discovery resource determined by a terminal a in the real discovery resource pool is a real discovery resource located at A[0][0]; after the frequency-domain virtual expansion, the terminal a may determine a virtual discovery resource in B[0][0] or B[3][0]. In this way, a probability of unlimitedly using a same discovery resource by multiple terminals can be lowered.

In an optional embodiment, that a virtual discovery resource pool obtained after the frequency-domain virtual expansion is performed on the real discovery resource pool includes N×X virtual sub-bands, where virtual expansion is performed on each sub-band to obtain X virtual sub-bands is specifically:

a virtual discovery resource pool obtained after frequency-domain virtual expansion is performed on an $m^{th}$ sub-band in the real discovery resource pool includes an $m^{th}$ virtual sub-band, an $(N+m)^{th}$ virtual sub-band, an $(N×2+m)^{th}$ virtual sub-band . . . , and an $(N×(X−1)+m)^{th}$ virtual sub-band, and therefore, the N×X virtual sub-bands obtained after the frequency-domain virtual expansion include X expansion duplicates, where every N continuous virtual sub-bands in the virtual discovery resource pool form one expansion duplicate. By using the schematic structural diagram, shown in FIG. 2, of a virtual discovery resource pool corresponding to a real discovery resource pool on which frequency-domain virtual expansion has been performed as an example, a virtual discovery resource pool obtained after frequency-domain virtual expansion is performed on a first sub-band in the real discovery resource pool includes a first virtual sub-band and a fourth virtual sub-band, and therefore, the six virtual sub-bands obtained after the frequency-domain virtual expansion include two expansion duplicates, where the first virtual sub-band to a third virtual sub-band in the virtual discovery resource pool form a first expansion duplicate, and the fourth virtual sub-band to a sixth virtual sub-band in the virtual discovery resource pool form a second expansion duplicate.

In an optional embodiment, that the processor 501 calls the program code stored in the memory 504 to perform, according to a preset time-frequency hopping solution based on the virtual discovery resource pool or a time-frequency hopping solution that is based on the virtual discovery resource pool and that is broadcast by the base station, virtual time-frequency hopping on a correspondence between the terminal and the determined virtual discovery resource in the virtual discovery resource pool is specifically:

performing, by using a same time-frequency hopping solution, virtual time-frequency hopping on the correspondence between the terminal and the determined virtual discovery resource in a same expansion duplicate of the virtual discovery resource pool.

By using a schematic structural diagram, shown in FIG. 3, of a virtual discovery resource pool after virtual time-frequency hopping is performed as an example, a two-dimensional array A[3][3] may be used to represent the real discovery resource pool, and a two-dimensional array B[6][3] may be used to represent the virtual discovery resource pool after the frequency-domain virtual expansion. A time-frequency hopping solution for the first expansion duplicate may be $i(t)=i(0)$, $j(t)=(j(0)+i(0)*t) \% n$, where n=3 and t=1, and the time-frequency hopping unit 130 may determine the virtual discovery resource in the virtual discovery resource pool according to the time-frequency hopping solution. A time-frequency location of the terminal a in a $0^{th}$ frame may be B[0][0] as shown in FIG. 3, that is $i(0)=0$, $j(0)=0$, and in this case, $i(1)=i(0)=0$, $j(1)=(j(0)+i(0))\%3=0$, that is, a time-frequency location, in a first frame, of the terminal a after the time-frequency hopping is B[0][0]. A time-frequency hopping solution for a terminal b in the second expansion duplicate may be $i(t)=(i(0)+t) \% n$, $j(t)=(j(0)+i(0)*t−1)\% n$, where n=3 and t=1, and the time-frequency hopping unit 130 may determine the virtual discovery resource in the virtual discovery resource pool according to the time-frequency hopping solution. A time-frequency location, in the $0^{th}$ frame, of the terminal b in the second expansion duplicate may be B[0][0] as shown in FIG. 3, that is, $i(0)=0$, $j(0)=0$, and in this case, $i(1)=(i(0)+1)\%3=1$, $j(1)=(j(0)+i(0)−1)\%3=0$, that is, a time-frequency location, in the first frame, of the terminal b in the second expansion duplicate after the time-frequency hopping is B[1][0]. Optionally, when a quantity of sub-bands of the real discovery resource is different from a quantity of sub-channels, virtual time-frequency hopping may be performed, by using a same time-frequency hopping solution, on correspondences with virtual discovery resources in the virtual discovery resource pool after the frequency-domain virtual expansion.

Specifically, the terminal described in this embodiment may be used to implement all or some of processes in an embodiment of a discovery resource time-frequency hopping method of the present invention described in the following with reference to FIG. 7.

Figure 6:
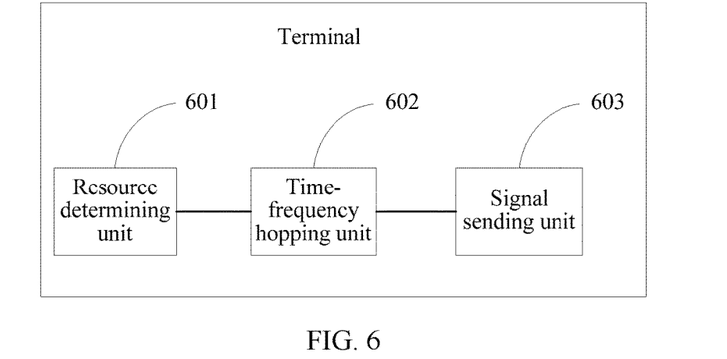
FIG. 6 is a schematic structural diagram of a terminal according to a third embodiment of the present invention.

Referring to FIG. 6, FIG. 6 is a schematic structural diagram of a terminal according to a third embodiment of the present invention. The terminal may include at least a resource determining unit 601, a time-frequency hopping unit 602, and a signal sending unit 603.

The resource determining unit 601 is configured to determine a real discovery resource in a real discovery resource pool. By using the real discovery resource pool shown in FIG. 2 as an example, frequency division multiplexing and time division multiplexing are performed on the real discovery resource pool to obtain 3×3 real discovery resources, where the real discovery resource pool includes three sub-bands and three sub-channels. In the real discovery resource pool shown in FIG. 2, each row represents a sub-band, and each column represents a sub-channel; a two-dimensional array A[3][3] may be used to represent the real discovery resource pool. The resource determining unit 601 determines, in the 3×3 real discovery resources, a real discovery resource used to send a discovery signal; for example, real discovery resources determined by a terminal a and a terminal b are both a real discovery resource located at A[0][0].

The time-frequency hopping unit 602 is configured to perform, according to a corresponding preset time-frequency hopping solution or a corresponding time-frequency hopping solution broadcast by a base station, time-frequency hopping on a correspondence between the terminal and the real discovery resource which is determined by the resource determining unit 601 and which is in the real discovery resource pool.

The time-frequency hopping solution run by the time-frequency hopping unit 602 in the real discovery resource pool includes at least two time-frequency hopping solutions. For example, the terminal a may perform time-frequency hopping on the correspondence between the terminal and the determined real discovery resource in the real discovery resource pool according to a preset time-frequency hopping solution corresponding to the terminal or a time-frequency hopping solution that is broadcast by the base station and that corresponds to the terminal, for example, i(t)=i(0), j(t)=j(0)+i(0)*t) % n; the terminal b may perform time-frequency hopping on the correspondence between the terminal and the determined real discovery resource in the real discovery resource pool according to another preset time-frequency hopping solution corresponding to the terminal or another time-frequency hopping solution that is broadcast by the base station and that corresponds to the terminal, for example, i(t)=(i(0)+t) % n, j(t)=(j(0)+i(0)*t−1)% n. In this case, multiple terminals occupying a same real discovery resource perform time-frequency hopping on a correspondence with the real discovery resource in the real discovery resource pool according to different time-frequency hopping solutions, and the multiple terminals may occupy different real discovery resources after the time-frequency hopping. In this way, a probability of sending, by multiple terminals, discovery signals by unlimitedly using a same real discovery resource can be lowered.

The signal sending unit 603 is configured to send a discovery signal by using a real discovery resource that is occupied after the time-frequency hopping unit 602 performs the time-frequency hopping.

In the terminal shown in FIG. 6, the resource determining unit 601 determines a real discovery resource in a real discovery resource pool; the time-frequency hopping unit 602 performs, according to a corresponding preset time-frequency hopping solution or a corresponding time-frequency hopping solution broadcast by a base station, time-frequency hopping on the correspondence between the terminal and the determined real discovery resource in the real discovery resource pool; and the signal sending unit 603 sends a discovery signal by using a real discovery resource that is occupied after the time-frequency hopping. In this way, an advantage of combination can be maintained, and a probability of sending, by multiple terminals, discovery signals by unlimitedly using a same real discovery resource can be lowered.

Figure 7:
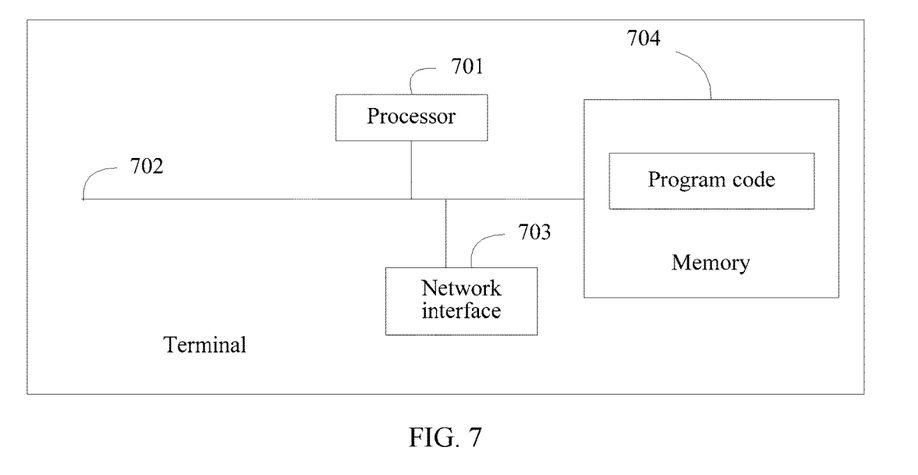
FIG. 7 is a schematic structural diagram of a terminal according to a fourth embodiment of the present invention.

Referring to FIG. 7, FIG. 7 is a schematic structural diagram of a terminal according to a fourth embodiment of the present invention, and the terminal is configured to execute a discovery resource time-frequency hopping method provided by an embodiment of the present invention. As shown in FIG. 7, the terminal includes: at least one processor 701, such as a CPU, at least one network interface 703, a memory 704, and at least one communications bus 702. The communications bus 702 is configured to implement connection and communication between these components. The memory 704 may include a high-speed RAM memory or may further include a non-volatile memory (non-volatile memory), for example, at least one magnetic disk memory. Optionally, the memory 704 may include at least one storage apparatus located away from the foregoing processor 701. The processor 701 may be combined with the terminal described in FIG. 6. The memory 704 stores a group of program code, and the processor 701 calls the program code stored in the memory 704, to execute the following operations:

determining a real discovery resource in a real discovery resource pool;

performing, according to a corresponding preset time-frequency hopping solution or a corresponding time-frequency hopping solution broadcast by a base station, time-frequency hopping on a correspondence between the terminal and the determined real discovery resource in the real discovery resource pool; and sending a discovery signal by using a real discovery resource that is in the real discovery resource pool and that is occupied after the time-frequency hopping.

By using the real discovery resource pool shown in FIG. 2 as an example, the real discovery resource pool includes 3×3 real discovery resources, where the real discovery resource pool includes three sub-bands and three sub-channels. In the real discovery resource pool shown in FIG. 2, each row represents a sub-band, and each column represents a sub-channel; a two-dimensional array A[3][3] may be used to represent the real discovery resource pool. The processor 701 determines, in the 3×3 real discovery resources, a real discovery resource used to send a discovery signal; for example, real discovery resources determined by a terminal a and a terminal b are both a real discovery resource located at A[0][0].

The time-frequency hopping solution in the real discovery resource pool includes at least two time-frequency hopping solutions. For example, the terminal a may perform time-frequency hopping on the correspondence between the terminal and the determined real discovery resource in the real discovery resource pool according to a preset time-frequency hopping solution corresponding to the terminal or a time-frequency hopping solution that is broadcast by the base station and that corresponds to the terminal, for example, i(t)=i(0), j(t)=(j(0)+i(0)*t) % n; the terminal b may perform time-frequency hopping on the correspondence between the terminal and the determined real discovery resource in the real discovery resource pool according to another preset time-frequency hopping solution corresponding to the terminal or another time-frequency hopping solution that is broadcast by the base station and that corresponds to the terminal, for example, i(t)=(i(0)+t) % n, j(t)=(j(0)+i(0)*t=1)% n. In this case, multiple terminals occupying a same real discovery resource perform time-frequency hopping on a correspondence with the real discovery resource in the real discovery resource pool according to different time-frequency hopping solutions, and the multiple terminals may occupy different real discovery resources after the time-frequency hopping. In this way, a probability of sending, by multiple terminals, discovery signals by unlimitedly using a same real discovery resource can be lowered.

Specifically, the terminal described in this embodiment may be used to implement all or some of processes in an embodiment of a discovery resource time-frequency hopping method of the present invention described in the following with reference to FIG. 8.

Figure 8:
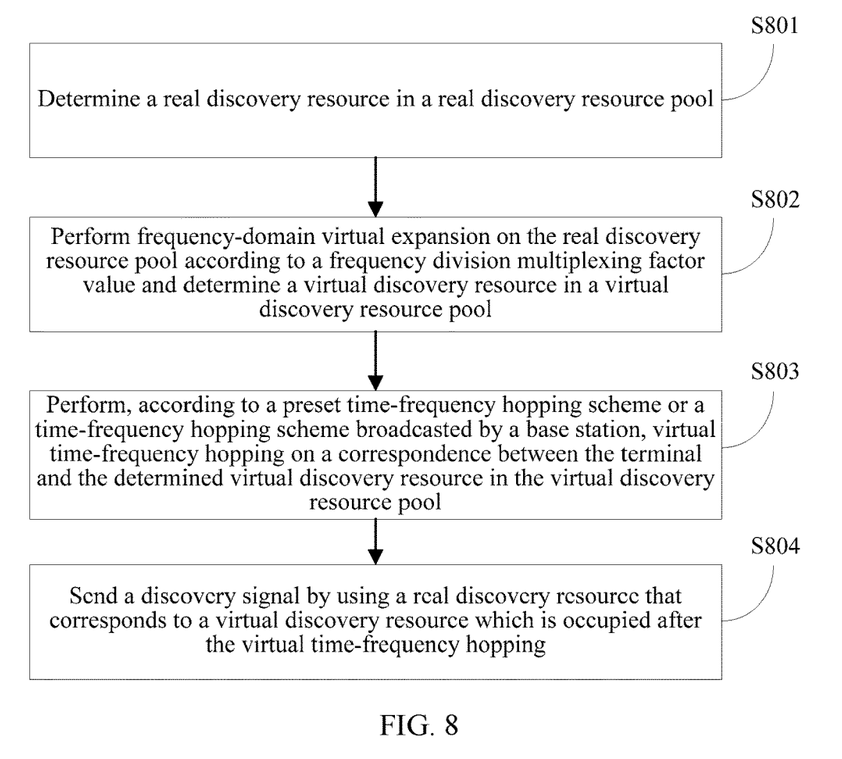
FIG. 8 is a schematic flowchart of a discovery resource time-frequency hopping method according to an embodiment of the present invention.

Referring to FIG. 8, FIG. 8 is a schematic flowchart of a discovery resource time-frequency hopping method according to an embodiment of the present invention; and the method includes:

S801: Determine a real discovery resource in a real discovery resource pool.

A terminal may determine the real discovery resource in the real discovery resource pool. By using a schematic structural diagram, shown in FIG. 2, of a real discovery resource pool as an example, frequency division multiplexing and time division multiplexing are performed on the real discovery resource pool to obtain 3×3 real discovery resources, where the real discovery resource pool includes three sub-bands and three sub-channels. In the real discovery resource pool shown in FIG. 2, each row represents a sub-band, and each column represents a sub-channel; a two-dimensional array A[3][3] may be used to represent the real discovery resource pool. The terminal may determine the real discovery resource in the real discovery resource pool. For example, a real discovery resource determined by a terminal a in the real discovery resource pool is a real discovery resource located at A[0][0]. When a quantity of terminals sending discovery signals is greater than a quantity of real discovery resources, at least two terminals use a same real discovery resource to send discovery signals.

S802: Perform frequency-domain virtual expansion on the real discovery resource pool according to a frequency division multiplexing factor value and determine a virtual discovery resource in a virtual discovery resource pool.

In specific implementation, the terminal may perform frequency-domain virtual expansion on the real discovery resource pool according to a preset frequency division multiplexing factor value or a frequency division multiplexing factor value broadcast by a base station, and does not perform any change in a time domain. By using the schematic diagram, shown in FIG. 2, of frequency-domain virtual expansion on a real discovery resource as an example, the frequency division multiplexing factor value may be 2; the terminal may perform the frequency-domain virtual expansion on the real discovery resource pool according to the frequency division multiplexing factor value; a virtual discovery resource pool after the frequency-domain virtual expansion is doubled in a frequency domain; the virtual discovery resource pool may be represented by a two-dimensional array B[6][3]. Further, the terminal may also determine the virtual discovery resource in the virtual discovery resource pool corresponding to the real discovery resource pool. For example, in the schematic structural diagram, shown in FIG. 2, of a virtual discovery resource pool corresponding to a real discovery resource pool on which frequency-domain virtual expansion has been performed, a virtual discovery resource determined by the terminal a in the virtual discovery resource pool is a virtual discovery resource located at B[0][0], and a virtual discovery resource determined by a terminal b in the virtual discovery resource pool is a virtual discovery resource located at B[3][0], where the terminal b sends a discovery signal by using a same real discovery resource as the terminal a before the virtual expansion. In this way, a probability of unlimitedly using a same discovery resource by multiple terminals can be lowered.

In an optional implementation manner, assuming that the frequency division multiplexing factor value is X and the real discovery resource pool includes N sub-bands, a virtual discovery resource pool obtained by the terminal after frequency-domain virtual expansion is performed on the real discovery resource pool includes N×X virtual sub-bands, where virtual expansion is performed on each sub-band to obtain X virtual sub-bands, and the terminal may determine the virtual discovery resource in sub-channels corresponding to the X virtual sub-bands obtained after the frequency-domain virtual expansion.

Further optionally, a virtual discovery resource pool obtained after the frequency-domain expansion unit 120 performs frequency-domain virtual expansion on an $m^{th}$ sub-band in the real discovery resource pool includes an $m^{th}$ virtual sub-band, an $(N+m)^{th}$ virtual sub-band, an $(N\times2+m)^{th}$ virtual sub-band . . . , and an $(N\times(X-1)+m)^{th}$ virtual sub-band, and therefore, the N×X virtual sub-bands obtained after the frequency-domain virtual expansion include X expansion duplicates. Every N continuous virtual sub-bands in the virtual discovery resource pool form one expansion duplicate. For example, in the schematic structural diagram, shown in FIG. 2, of a virtual discovery resource pool corresponding to a real discovery resource pool on which frequency-domain virtual expansion has been performed, a two-dimensional array A[3][3] may be used to represent the real discovery resource pool, and a two-dimensional array B[6][3] may be used to represent the virtual discovery resource pool obtained after the frequency-domain virtual expansion. A virtual discovery resource pool obtained after virtual expansion is performed on a first row of the real discovery resource pool may include a first row and a fourth row. The first row to a third row of the virtual discovery resource pool form a first expansion duplicate, and the fourth row to a sixth row of the virtual discovery resource pool form a second expansion duplicate.

S803: Perform, according to a preset time-frequency hopping solution or a time-frequency hopping solution broadcast by a base station, virtual time-frequency hopping on a correspondence between the terminal and the determined virtual discovery resource in the virtual discovery resource pool.

The terminal may perform, according to the preset time-frequency hopping solution based on the virtual discovery resource pool or the time-frequency hopping solution that is based on the virtual discovery resource pool and that is broadcast by the base station, virtual time-frequency hopping on the correspondence between the terminal and the determined virtual discovery resource in the virtual discovery resource pool, so as to obtain correspondences, on which the virtual time-frequency hopping has been performed, between terminals and virtual discovery resources in the virtual discovery resource pool. For example, in a schematic structural diagram, shown in FIG. 3, of a virtual discovery resource pool after virtual time-frequency hopping is performed, a virtual discovery resource determined by the terminal a in the virtual discovery resource pool after the frequency-domain virtual expansion is a virtual discovery resource located at B[0][0]; the terminal a may perform virtual time-frequency hopping on the correspondence with the virtual discovery resource in the virtual discovery resource pool according to the preset time-frequency hopping solution based on the virtual discovery resource pool or the time-frequency hopping solution that is based on the virtual discovery resource pool and that is broadcast by the base station. A virtual discovery resource determined by the terminal a after the virtual time-frequency hopping is the virtual discovery resource located at B[0][0].

Virtual time-frequency hopping is performed on correspondences between virtual discovery resources in a same expansion duplicate of the virtual discovery resource pool and terminals by using a same time-frequency hopping solution. For example, a time-frequency hopping solution for the first expansion duplicate may be $i(t)=i(0)$, $j(t)=(j(0)+i(0)*t)\%n$, where n=3 and t=1. The terminal may determine the virtual discovery resource in the virtual discovery resource pool according to the time-frequency hopping solution. A time-frequency location of the terminal a in a $0^{th}$ frame may be B[0][0] as shown in FIG. 3, that is, $i(0)=0$, $j(0)=0$, and in this case, $i(1)=i(0)=0$, $j(1)=(j(0)+i(0))\%3=0$, that is, a time-frequency location, in a first frame, of the terminal a after the time-frequency hopping is B[0][0]. A time-frequency hopping solution for the second expansion duplicate may be $i(t)=(i(0)+t)\%n$, $j(t)=(j(0)+i(0)*t-1)\%n$, where n=3 and t=1. The time-frequency hopping unit 130 may determine the virtual discovery resource in the virtual discovery resource pool according to the time-frequency hopping solution. A time-frequency location, in the $0^{th}$ frame, of the terminal b in the second expansion duplicate may be B[0][0] as shown in FIG. 3, that is, $i(0)=0$, $j(0)=0$, and in this case $i(1)=(i(0)+1)\%3=1, j(1)=(j(0)+i(0)-1)\%3=0$, that is, a time-frequency location, in the first frame, of the terminal b in the second expansion duplicate after the time-frequency hopping is B[1][0]. Optionally, when a quantity of sub-bands of the real discovery resource is different from a quantity of sub-channels, virtual time-frequency hopping may be performed, by using a time-frequency hopping solution, on correspondences with virtual discovery resources in the virtual discovery resource pool after the frequency-domain virtual expansion.

S804: Send a discovery signal by using a real discovery resource that corresponds to a virtual discovery resource which is occupied after the virtual time-frequency hopping.

After determining the virtual discovery resource occupied after the virtual time-frequency hopping, the terminal may send the discovery signal by using the real discovery resource corresponding to the virtual discovery resource. Specifically, by using a schematic structural diagram, shown in FIG. 4, of a real discovery resource pool corresponding to a virtual discovery resource pool after virtual time-frequency hopping is performed as an example, a virtual discovery resource, in the virtual discovery resource pool, determined by the terminal a after time-frequency hopping based on the virtual discovery resource pool is performed is a virtual discovery resource located at B[0][0], and in this case, the terminal may send the discovery signal by using the real discovery resource that corresponds to the virtual discovery resource, where the real discovery resource that corresponds to the virtual discovery resource and that is occupied by the terminal a is a real discovery resource located at A[0][0].

In the discovery resource time-frequency hopping method shown in FIG. 8, a terminal determines a real discovery resource in a real discovery resource pool, performs frequency-domain virtual expansion on the real discovery resource pool according to a preset frequency division multiplexing factor value or a frequency division multiplexing factor value broadcast by a base station and determines a virtual discovery resource in a virtual discovery resource pool corresponding to the real discovery resource pool, then performs, according to a preset time-frequency hopping solution based on the virtual discovery resource pool or a time-frequency hopping solution that is based on the virtual discovery resource pool and that is broadcast by the base station, virtual time-frequency hopping on the correspondence between the terminal and the determined virtual discovery resource in the virtual discovery resource pool, and sends a discovery signal by using a real discovery resource that corresponds to a virtual discovery resource which is occupied after the virtual time-frequency hopping. In this way, an advantage of combination can be maintained, and a probability of sending, by multiple terminals, discovery signals by unlimitedly using a same real discovery resource can be lowered.

An embodiment of the present invention further provides a computer storage medium, where the computer storage medium stores a program, and when executed, the program includes all or some of the steps of the discovery resource time-frequency hopping method described in the embodiment of the present invention with reference to FIG. 8.

Figure 9:
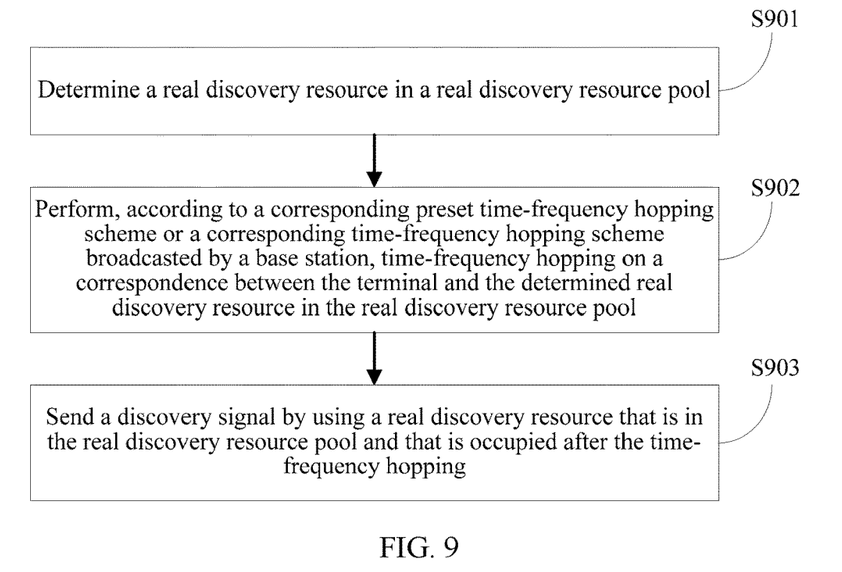
FIG. 9 is a schematic flowchart of a discovery resource time-frequency hopping method according to another embodiment of the present invention.

Referring to FIG. 9, FIG. 9 is a schematic flowchart of a discovery resource time-frequency hopping method according to another embodiment of the present invention; and the method specifically includes:

S901: Determine a real discovery resource in a real discovery resource pool.

A terminal may determine the real discovery resource in the real discovery resource pool. By using the real discovery resource pool shown in FIG. 2 as an example, frequency division multiplexing and time division multiplexing are performed on the real discovery resource pool to obtain 3×3 real discovery resources, where the real discovery resource pool includes three sub-bands and three sub-channels. In the real discovery resource pool shown in FIG. 2, each row represents a sub-band, and each column represents a sub-channel; a two-dimensional array A[3][3] may be used to represent the real discovery resource pool. The terminal may determine the real discovery resource in the real discovery resource pool. For example, a real discovery resource determined by a terminal a in the real discovery resource pool is a real discovery resource located at A[0][0]. When a quantity of terminals sending discovery signals is greater than a quantity of real discovery resources, at least two terminals use a same real discovery resource to send discovery signals.

S902: Perform, according to a corresponding preset time-frequency hopping solution or a corresponding time-frequency hopping solution broadcast by a base station, time-frequency hopping on a correspondence between the terminal and the determined real discovery resource in the real discovery resource pool.

In specific implementation, the terminal may perform, according to the preset time-frequency hopping solution corresponding to the terminal or the time-frequency hopping solution that is broadcast by the base station and that corresponds to the terminal, the time-frequency hopping on the correspondence between the terminal and the determined real discovery resource in the real discovery resource pool, where the time-frequency hopping solution run in the real discovery resource pool includes at least two time-frequency hopping solutions. For example, the terminal a may perform time-frequency hopping on the correspondence between the terminal and the determined real discovery resource in the real discovery resource pool according to a preset time-frequency hopping solution corresponding to the terminal or a time-frequency hopping solution that is broadcast by the base station and that corresponds to the terminal, for example, $i(t)=i(0), j(t)=(j(0)+i(0)*t) \% n$; a terminal b may perform time-frequency hopping on the correspondence between the terminal and the determined real discovery resource in the real discovery resource pool according to another preset time-frequency hopping solution corresponding to the terminal or another time-frequency hopping solution that is broadcast by the base station and that corresponds to the terminal, for example, $i(t)=(i(0)+t) \% n$, $j(t)=(j(0)+i(0)*t-1)\% n$. In this case, multiple terminals occupying a same real discovery resource perform time-frequency hopping on a correspondence with the real discovery resource in the real discovery resource pool according to different time-frequency hopping solutions. Multiple terminals may occupy different real discovery resources after the time-frequency hopping. In this way, a probability of sending, by multiple terminals, discovery signals by unlimitedly using a same real discovery resource can be lowered.

S903: Send a discovery signal by using a real discovery resource that is in the real discovery resource pool and that is occupied after the time-frequency hopping.

The terminal may send the discovery signal by using the real discovery resource that is in the real discovery resource pool and that is occupied after the time-frequency hopping.

In the discovery resource time-frequency hopping method shown in FIG. 9, a terminal determines a real discovery resource in a real discovery resource pool, performs, according to a corresponding preset time-frequency hopping solution or a corresponding time-frequency hopping solution broadcast by a base station, time-frequency hopping on the correspondence between the terminal and the determined real discovery resource in the real discovery resource pool, and sends a discovery signal by using a real discovery resource that is in the real discovery resource pool and that is occupied after the time-frequency hopping; in this way, an advantage of combination can be maintained, and a probability of sending, by multiple terminals, discovery signals by unlimitedly using a same real discovery resource can be lowered.

An embodiment of the present invention further provides a computer storage medium, where the computer storage medium stores a program, and when executed, the program includes all or some of the steps of the discovery resource time-frequency hopping method described in the embodiment of the present invention with reference to FIG. 9.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

It should be noted that, in the foregoing embodiments, the description of each embodiment has respective focuses. For a part that is not described in detail in an embodiment, reference may be made to related descriptions in other embodiments. In addition, a person skilled in the art should also understand that the embodiments described in this specification all belong to exemplary embodiments, and the involved actions and units are not necessarily mandatory to the present invention.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A terminal, comprising a network interface, a memory, and a processor, wherein the memory stores program code, and the processor is configured to call the program code stored in the memory, to execute the following operations:
  determining a real discovery resource in a real discovery resource pool;
  performing frequency-domain virtual expansion on the real discovery resource pool according to a preset frequency division multiplexing factor value or a frequency division multiplexing factor value broadcast by a base station and determining a virtual discovery resource in a virtual discovery resource pool corresponding to the real discovery resource pool;
  performing, according to a preset time-frequency hopping solution based on the virtual discovery resource pool or a time-frequency hopping solution that is based on the virtual discovery resource pool and that is broadcast by the base station, virtual time-frequency hopping on a correspondence between the terminal and the determined virtual discovery resource in the virtual discovery resource pool; and
  sending a discovery signal using a real discovery resource that corresponds to a virtual discovery resource which is occupied after the virtual time-frequency hopping.

2. The terminal according to claim 1, wherein the frequency division multiplexing factor value is X and the real discovery resource pool comprises N sub-bands, the virtual discovery resource pool obtained after the frequency-domain virtual expansion is performed on the real discovery resource pool comprises N×X virtual sub-bands, wherein virtual expansion is performed on each sub-band to obtain X virtual sub-bands, and the virtual discovery resource is determined in sub-channels corresponding to the X virtual sub-bands obtained after the expansion.

3. The terminal according to claim 2, wherein the virtual discovery resource pool obtained after virtual expansion is performed on an $m^{th}$ sub-band in the real discovery resource pool comprises an $m^{th}$ virtual sub-band, an $(N+m)^{th}$ virtual sub-band, an $(N\times2+m)^{th}$ virtual sub-band, and an $(N\times(X-1)+m)^{th}$ virtual sub-band, and the N×X virtual sub-bands obtained after the virtual expansion comprise X expansion duplicates, wherein every N continuous virtual sub-bands in the virtual discovery resource pool form one expansion duplicate.

4. The terminal according to claim 3, wherein the performing, according to the preset time-frequency hopping solution based on the virtual discovery resource pool or the time-frequency hopping solution that is based on the virtual discovery resource pool and that is broadcast by the base station, virtual time-frequency hopping on the correspondence between the terminal and the determined virtual discovery resource in the virtual discovery resource pool comprises:
  performing, using a same time-frequency hopping solution, virtual time-frequency hopping on the correspondence between the terminal and the virtual discovery resource which is determined by the frequency-domain expansion unit and which is in a same expansion duplicate of the virtual discovery resource pool.

5. A discovery resource time-frequency hopping method configured for a terminal, the method comprising:
  determining a real discovery resource in a real discovery resource pool;
  performing frequency-domain virtual expansion on the real discovery resource pool according to a preset frequency division multiplexing factor value or a frequency division multiplexing factor value broadcast by a base station and determining a virtual discovery resource in a virtual discovery resource pool corresponding to the real discovery resource pool;
  performing, according to a preset time-frequency hopping solution based on the virtual discovery resource pool or a time-frequency hopping solution that is based on the virtual discovery resource pool and that is broadcast by the base station, virtual time-frequency hopping on a correspondence between the terminal and the determined virtual discovery resource in the virtual discovery resource pool; and
  sending a discovery signal using a real discovery resource that corresponds to a virtual discovery resource which is occupied after the virtual time-frequency hopping.

6. The method according to claim 5, wherein the performing frequency-domain virtual expansion on the real discovery resource pool according to the preset frequency division multiplexing factor value or the frequency division multiplexing factor value broadcast by the base station and determining the virtual discovery resource in the virtual discovery resource pool corresponding to the real discovery resource pool comprises:

the frequency division multiplexing factor value is X and the real discovery resource pool comprises N sub-bands, the virtual discovery resource pool obtained after the virtual expansion is performed on the real discovery resource pool comprises N×X virtual sub-bands, wherein virtual expansion is performed on each sub-band to obtain X virtual sub-bands, and the virtual discovery resource is determined in sub-channels corresponding to the X virtual sub-bands obtained after the expansion.

7. The method according to claim 6, wherein that the virtual discovery resource pool obtained after the virtual expansion is performed on the real discovery resource pool comprises N×X virtual sub-bands, wherein virtual expansion is performed on each sub-band to obtain X virtual sub-bands comprises:

the virtual discovery resource pool obtained after virtual expansion is performed on an $m^{th}$ sub-band in the real discovery resource pool comprises an $m^{th}$ virtual sub-band, an $(N+m)^{th}$ virtual sub-band, an $(N\times 2+m)^{th}$ virtual sub-band, and an $(N\times(X-1)+m)^{th}$ virtual sub-band, and the N×X virtual sub-bands obtained after the virtual expansion comprise X expansion duplicates, wherein every N continuous virtual sub-bands in the virtual discovery resource pool form one expansion duplicate.

8. The method according to claim 7, wherein the performing, according to the preset time-frequency hopping solution based on the virtual discovery resource pool or the time-frequency hopping solution that is based on the virtual discovery resource pool and that is broadcast by the base station, virtual time-frequency hopping on the correspondence between the terminal and the determined virtual discovery resource in the virtual discovery resource pool comprises:

performing, using a same time-frequency hopping solution, virtual time-frequency hopping on the correspondence between the terminal and the determined virtual discovery resource in a same expansion duplicate of the virtual discovery resource pool.

* * * * *